United States Patent
Soyland et al.

(10) Patent No.: US 8,272,407 B2
(45) Date of Patent: Sep. 25, 2012

(54) FLEXIBLE HOSE AND A PAINT APPLICATION APPARATUS AND SYSTEM WITH SAME

(75) Inventors: Svein Soyland, Kverneland (NO); Jose Rodrigues, Hafrsfjord (NO)

(73) Assignee: ABB AS (NO)

( * ) Notice: Subject to any disclaimer, the term of this patent is extended or adjusted under 35 U.S.C. 154(b) by 1043 days.

(21) Appl. No.: 12/212,259

(22) Filed: Sep. 17, 2008

(65) Prior Publication Data

US 2009/0071400 A1 Mar. 19, 2009

(30) Foreign Application Priority Data

Sep. 17, 2007 (EP) .................................... 07116571

(51) Int. Cl.
*F16L 9/14* (2006.01)

(52) U.S. Cl. ........ 138/148; 138/137; 138/140; 138/149; 138/109

(58) Field of Classification Search .................. 138/114, 138/149, 148, 137, 140, 109; 239/397.5, 239/588, 690.1, 699, 704, 708
See application file for complete search history.

(56) References Cited

U.S. PATENT DOCUMENTS

| | | | | |
|---|---|---|---|---|
| 3,717,718 A | * | 2/1973 | Schmidtchen | 174/106 D |
| 3,780,206 A | * | 12/1973 | Reynolds | 174/36 |
| 3,828,112 A | | 8/1974 | Johansen et al. | 174/47 |
| 4,039,740 A | * | 8/1977 | Iwata | 174/15.5 |
| 4,179,582 A | * | 12/1979 | Garcia | 174/15.3 |
| 4,262,162 A | * | 4/1981 | Plinke et al. | 174/15.6 |
| 4,435,475 A | * | 3/1984 | Sasaki et al. | 428/409 |
| 5,056,720 A | * | 10/1991 | Crum et al. | 239/698 |
| 5,275,659 A | * | 1/1994 | Shutic et al. | 118/315 |
| 5,725,161 A | * | 3/1998 | Hartle | 239/690 |
| 6,021,965 A | * | 2/2000 | Hartle | 239/706 |
| 6,986,366 B2 | | 1/2006 | Martin et al. | 138/98 |

FOREIGN PATENT DOCUMENTS

| | | |
|---|---|---|
| EP | 1389492 A2 | 2/2004 |
| EP | 1614478 A1 | 1/2006 |
| GB | 2139312 A | 11/1984 |
| WO | 9846923 A1 | 10/1998 |
| WO | 2006032943 A1 | 3/2006 |
| WO | 2007042990 A1 | 4/2007 |

OTHER PUBLICATIONS

European Search Report, Feb. 7, 2008, 7 pages.

* cited by examiner

*Primary Examiner* — Patrick F Brinson
(74) *Attorney, Agent, or Firm* — St. Onge Steward Johnston & Reens LLC

(57) ABSTRACT

An insulated hose for a high voltage paint application apparatus including an inner hose containing a fluid or paint charged at a high voltage. The flexible inner tube hose is arranged inside at least one flexible mechanical protection tube or layer and an air excluding medium is enclosed between flexible inner tube and first flexible mechanical protection layer. A mechanical protection layer may be surrounded by an electrical protection layer which is grounded. A system for applying paint or other fluid materials at a high voltage is also described.

38 Claims, 4 Drawing Sheets

FLEXIBLE HOSE AND A PAINT APPLICATION APPARATUS AND SYSTEM WITH SAME

CROSS-REFERENCE TO RELATED APPLICATIONS

The present application claims priority of European patent application No. 07116571.6 filed on Sep. 17, 2007, the content of which is incorporated herein by reference.

FIELD OF THE INVENTION

The invention relates to a device forming part of an apparatus for applying paint or other fluid materials with a high voltage paint application apparatus or system. In particular the invention relates to an improved supply line hose capable of delivering a supply of paint in a high voltage painting system.

BACKGROUND OF THE INVENTION

The present invention is related to a supply line hose for use in a spray painting apparatus or installation. The spray painting apparatus provides for a dosed paint supply to the applicator or spray gun, and in particular for the case in which the applicator is charged at a high voltage for electrical atomizing of a electrically conductive paint or other fluid. Such a spray painting apparatus must be well insulated, explosion-resistant and reliable, without being excessively difficult or expensive to implement. When painting with direct charge of the fluid, using a conductive paint, the fluid in the hose will be charged with a voltage that may typically be up to 100 kV or so. For this reason, application with direct charge of conductive fluids such as water borne paints requires an effective insulation or galvanic blocking between a spray gun/applicator charged with a high voltage and apparatus at zero or ground potential, in particular a paint dosing device and/or the paint lines supplying the dosing device.

An international patent application WO IB2004/003104 (Anfindsen et al), assigned to ABB, which is hereby incorporated in full by means of this reference, describes an improved spray painting system with a dosing device. In particular it describes means for achieving a galvanic block, or voltage block, between the dosed fluid in contact with a high voltage and the fluid in the supply lines or paint kitchen etc which is normally at ground potential. In this description a dosing device is described which comprises one or more dosing cylinders which may be filled at a paint supply point, moved away from the supply point and towards a spray head connection point or docking head of a valve block for handling colour painting and flushing operations, and from there connected to one or more spray heads.

A supply line so connected between a dosing cylinder connection point or valve block and an applicator or spray head has to insulate the spray head the paint supply at high voltage in the supply line from the surroundings. It is known from, for example, U.S. Pat. No. 6,986,366 B2 entitled Piggable pipe for electrostatic coating of pieces, assigned to Duerr Systems GmbH, that known paint hoses constructed from multi-layer tubes to achieve sufficient insulating performance may have an unsatisfactory bending ability in use, i.e. insufficient ability to bend about the long axis of the hose, and are limited to bends with a large radius. It is known from an international application WO2007042990A1 entitled Paint application apparatus and system with same, assigned to ABB, to construct a flexible high voltage hose with an insulation gap containing air arranged between the inner hose and a second insulating layer.

SUMMARY OF THE INVENTION

An embodiment of the present invention provides an improvement to an insulated supply conduit in the form of a flexible hose for a paint application apparatus maintained in part at a high voltage comprising a flexible inner tube containing a paint, a conductive paint or other fluid maintained at a high voltage, arranged inside at least one outer mechanical protection tube or layer where a space is arranged between the flexible inner hose and the outer mechanical protection layer which space is filled with an air-excluding medium, preferably a fluid.

Another embodiment of the present invention provides an improvement to an insulated supply conduit in the form of a flexible hose for a paint application apparatus, with a flexible inner tube arranged inside at least one outer mechanical protection layer wherein the whole volume in between the inner tube and the outer protection layer is occupied by the air-excluding medium, preferably a fluid.

Another embodiment of the present invention provides an improvement to an insulated supply conduit in the form of a flexible hose for a paint application apparatus, with a flexible inner tube arranged inside at least one outer mechanical protection tube or layer wherein a fluid air-excluding medium with lubrication properties to provide lubrication between the inner surface of the outer protection layer and the outer surface of the inner tube is arranged in a space between the flexible inner tube and the mechanical protection layer. In another embodiment of the present invention an improvement to an insulated supply conduit is provided in the form of a flexible hose for a paint application apparatus, with a flexible inner tube arranged inside at least one outer mechanical protection layer, wherein the fluid air-excluding medium between the flexible inner tube and the mechanical protection layer is a non-polar fluid.

Another embodiment of the present invention provides an improvement to a flexible hose for a paint application apparatus maintained in part at a high voltage comprising a flexible inner tube containing a paint or other fluid maintained at a high voltage, arranged inside at least one outer mechanical protection tube or layer, wherein the outer mechanical protection layer is spaced radially apart from the flexible inner tube, and the space between the outer mechanical protection layer and flexible inner tube is filled with an air-excluding medium, preferably in the form of a fluid.

An embodiment of the present invention provides an improvement to an supply line for a paint application apparatus, in the form of a flexible hose with a first flexible inner tube arranged inside at least one outer mechanical protection tube or layer wherein a fluid air-excluding medium has sufficient properties to maintain a film of air-excluding medium between the first flexible inner tube and the first outer mechanical protection layer during flexing or bending of the hose. In another embodiment of the present invention improvement is provided in the form of a flexible hose for a paint application apparatus, with a flexible inner tube arranged inside at least one outer mechanical protection tube or layer wherein a fluid air-excluding medium has sufficient properties to maintain a film of air-excluding medium, preferably fluid, between the first flexible inner tube and the first outer mechanical protection layer during flexing, bending or twisting of the hose and a lubrication property sufficient to provide lubrication between the inner surface of the outer mechanical protection layer and the outer surface of the flexible inner tube when the flexible inner tube due to bending or flexing of the flexible hose.

According to another embodiment of the present invention an improvement is provides to an insulated supply conduit in the form of a flexible hose for a paint application wherein the external surface or a covering of a first outer mechanical protection layer is partly covered by an electrical protection conductive or non-insulating layer which is connected to a ground or earth terminal. Another embodiment of the present invention provides an improvement wherein an external surface of the hose is partly covered by a conductive or non-insulating electrical protection layer comprising a metal tape, wire or filament which is connected to a ground or earth terminal.

Another embodiment of the present invention provides an improvement wherein a first outer mechanical protection layer is covered by a conductive or non-insulating electrical protection layer comprising a metal tape, wire or filament which is connected to a ground or earth terminal, and where at least one further outer mechanical layer is arranged covering the electrical protection layer.

According to another embodiment an improvement is provided whereby the conductive or non-insulating layer around the hose and connected to ground or earth potential does not extend the full length of the hose and is limited to within a predetermined distance from at least one connection point of the hose.

According to another embodiment of the invention improvement to an insulated supply conduit in the form of a flexible hose for a paint application apparatus, with a flexible inner tube arranged inside at least one outer mechanical protection tube or layer wherein a fluid air-excluding medium with properties to provide a film of air-excluding medium between the inner surface of the outer protection layer and the outer surface of the inner tube is arranged in a space between the flexible inner tube and the mechanical protection layer and arranged at least at one end of the flexible inner tube a sealing means in the form of an end cap means sealing off the space between the first mechanical protection layer and the flexible inner tube, and thereby arranged for preventing leakage of the air-excluding medium and/or entry of air.

According to another aspect of the invention a system is provided for applying paint or other fluid materials to a substrate comprising at least one robot which is equipped with a paint application apparatus maintained in part at a high voltage comprising an improved flexible high voltage hose which comprises an inner hose containing a paint or other coating material which is arranged surrounded by a first outer mechanical protection layer wherein a space is arranged between a flexible inner tube and the first outer mechanical protection layer which space is filled with a fluid air-excluding medium.

According to another embodiment of the invention an improved system for applying paint or other fluid materials to a substrate is provided wherein the improved flexible hose comprises a gap arranged between the flexible inner hose and at least one outer mechanical protection layer which gap contains vaseline or another non-conducting fluid.

The invention may be summarily described as comprising a flexible and insulated hose for a paint spraying apparatus. When painting with direct charge of the paint or coating fluid, the paint in the hose will be charged with a voltage that may typically be up 80 to 100 kV or exceptionally higher. The invention is applicable to coating systems applying a conductive fluid such as a water-borne paint. The fluid hose must be able to conduct paint or fluid from a supply point such as a valve block, a dosing cylinder or other supply means to the applicator or spray head. The hose must insulate the fluid from any grounded surroundings. The hose should not be charged on the external surface, and at the same time it must be flexible, so that the hose can be routed over moving or rotating joints. In a modern robot spray painting arrangement the applicator on the end of the robot arm may rotate around an axis of the applicator to plus or minus one full rotation, or even greater. Thus the part of the paint hose connected to the applicator, the innermost tube of the hose, is also rotated in use through one or two full turns, and the inner tube must therefore be flexible against torsion and rotation.

This is achieved according to an embodiment of the present invention by including a plurality of hoses or layers inside each other, arranged such that there is a small gap between each hose and in particular where the first gap between first flexible inner tube containing paint fluid and first flexible mechanical protection layer is filled with an air-excluding material which also has lubrication properties to facilitate the movement of the inner hose with respect to an outer mechanical protection layer. The insulation value of the hose is provided primarily by the insulation performance of the flexible inner tube and secondarily by the exclusion of air from around the flexible inner tube. The first outer mechanical protection layer is a non-conducting layer. The provision according to an embodiment of the invention of a flexible hose comprising at least two layers, the first inner flexible tube and an outer mechanical protection layer, arranged with a small gap between them filled with an air-excluding medium, preferably a fluid medium, which small gap allows the hose to be flexible.

The principal advantage of such an improved flexible hose according to an embodiment of the invention is that the paint handling systems, the paint lines and the paint kitchen are isolated from those system parts, principally the applicator, that are charged at a high voltage during operation. Providing a flexible and insulated supply line between docking head or valve block and applicator enables a robust apparatus and system for painting and coating that may also be operated in a flexible way with full freedom to include paint changes, colour changes and/or flushing sequences efficiently.

For certain applications the improved hose may, if so required, be constructed using a flexible inner hose that is suitable for cleaning or flushing by pigging, i.e. by moving a pig through a part of the inner hose to push out paint or cleaning materials to clean the system, to change colour, or to recover paint. The improved flexible hose is able to insulate the paint fluid from the grounded surroundings without the hose being charged on the outermost surface, and at the same time be flexible, so that the hose can be routed over a moving joint such as that between a robot arm or robot wrist and a spray gun or applicator. Such a flexible hose may also be used to supply paint to applicators or spray heads arranged fitted on simpler machines than multi-axis robots, machines such as reciprocating painting machines, Cartesian robots, or machines that operate on only one or two degrees of freedom.

Another benefit of the flexible hose which can flex and is also insulating is that it typically permits use of a relatively short hose across the joint. This provides for more economic production as less paint is lost from the short line during colour changing or flushing. In addition the improved flexible hose may be arranged adjacent an external surface of the painting apparatus or robot. An externally mounted hose provides for simplified maintenance as it is quick and easy to inspect and also to access for repair or replacement if necessary.

BRIEF DESCRIPTION OF THE DRAWINGS

The invention will now be further explained by means of exemplary embodiments and with reference to the accompanying drawings, on which.

DETAILED DESCRIPTION OF THE INVENTION

Figure 1:
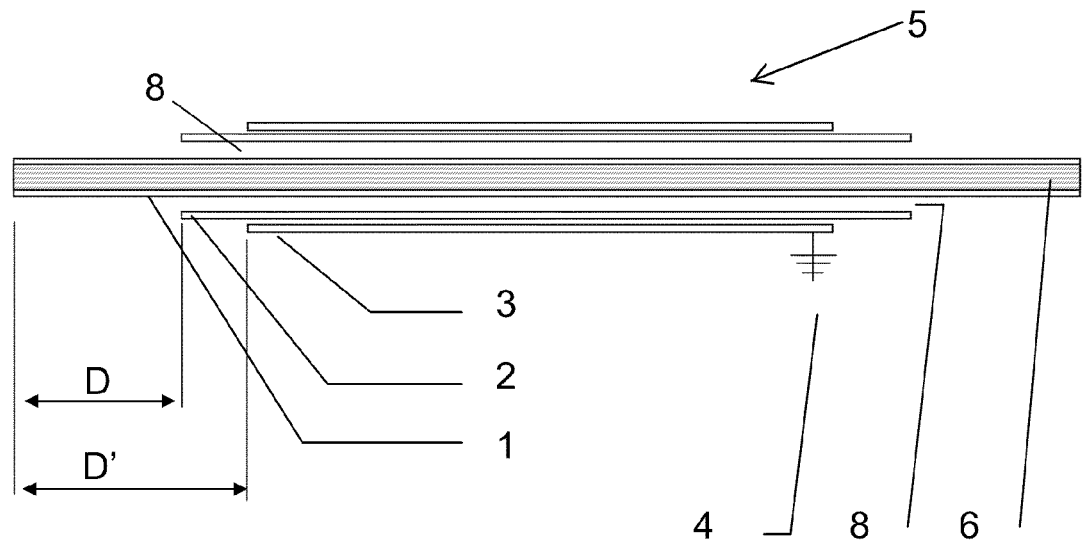
FIG. 1 shows a cross-section view of an improved flexible hose for a paint application apparatus, maintained in part at a high voltage, according to an embodiment of the invention.

FIG. 1 shows a schematic diagram of a high voltage hose 5 according to an embodiment of the invention. The figure shows a hose 5 conducting paint 6 or another fluid coating material. Hose 5 comprises a flexible inner tube 1 which is surrounded by a second layer, a first flexible mechanical protection layer 2. Between the first flexible inner tube 1 and the outer flexible mechanical protection layer 2 is arranged an air excluding medium 8. The air-excluding medium is a non-conducting material and preferably a fluid or semi-fluid material with known lubrication properties such as an oil or grease, for example vaseline. The air excluding medium is a non-polar material or material which does not have a tendency to ionise or otherwise breakdown under the influence of a strong electric field. Preferably the air excluding medium has a viscosity or other material properties sufficient to provide or maintain a film of air-excluding material between the inner tube 1 and the first outer protection layer 2 when the flexible hose is subject to bending or flexing or twisting under torsion. Such a fluid air-excluding medium 8 as described herein may comprise medium material in a state from the group of: liquid, gel, semi-solid, thixotropic material.

Surrounding the flexible mechanical protection layer 2 is a conducting or non-insulating material e.g. a wire, tape arranged on an electrical protection layer 3 which is grounded at at least one point 4. The conducting or non insulating electrical protection layer 3 may not extend over the whole length of the hose, and may be arranged to terminate a predetermined distance D' away from a point on at least one end of the hose where the hose, at ground or near ground potential, is connected to apparatus at high voltage, see below for example T1 or T2 from FIG. 5.

Inner flexible tube 1, containing the paint fluid 6, is preferably made of a fluorinated plastic compound of the PTFE type, or a polymer blend or co-polymer containing PTFE or similar. Outer first mechanical protection layer 2 is preferably also made of a fluorinated or PTFE related plastic material or composite, as the material has a low coefficient of friction which facilitates internal cleaning and pigging of the inner bore of inner hose 1. Wear and or drag on the outside surface of the first flexible outer mechanical protection layer is thus also reduced where the layer comes into contact with its surroundings.

Figures 2A, 2B:
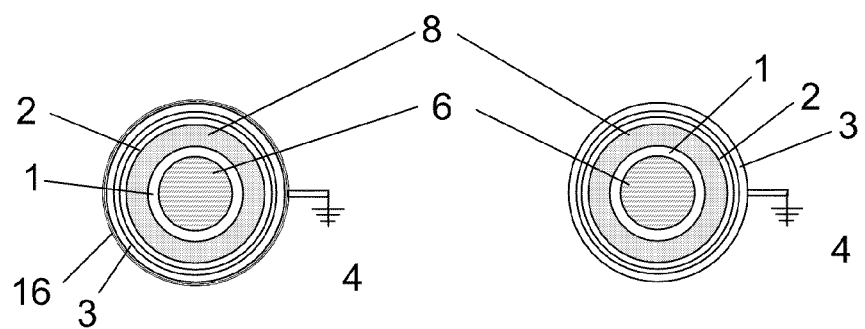
FIG. 2*a* shows a schematic arrangement of a cross section of an improved flexible hose for a paint application apparatus according to an embodiment of the invention.
FIG. 2*b* shows a cross section with an embodiment in which an outer electrical protection layer comprises a conductive layer on the outside surface.

FIG. 2*a* shows a cross section of the improved flexible hose. FIG. 2*a* shows a flexible inner tube 1 containing a paint fluid 6 at high voltage. Around the flexible inner tube 1 is an air excluding medium 8. Around the air excluding medium is a first flexible mechanical protection layer 2 which keeps the air excluding medium in place and also protects the flexible inner tube from contact or near-contact with any grounded point or surface in the surroundings. A outer electrical protection layer 3 is connected to an earth or ground 4, for example by one or more wires or tapes arranged on the outside surface of electrical protection layer 3. The conducting or non insulating layer may, for example, comprise one or more copper tapes. FIG. 2*b* shows another embodiment with a cross section in which the outer electrical protection layer 3 has an outermost surface or layer which comprises a conductive or semi-conductive layer 16, to which is connected an earth or ground 4. The flexible hose contains at least one mechanical protection layer 2 arranged around the flexible inner tube 1 with the air-excluding medium 8 in the gap between the inner tube and the first mechanical protection layer 2. In optional forms the flexible hose may have more than one mechanical protection layer arranged surrounding the first flexible mechanical layer 2. One or more outer layers may be arranged over the electrical protection layer 3.

The required insulation value is achieved by arranging a small gap between a first flexible inner tube containing paint fluid and a first flexible mechanical protection layer but with air excluded from the first gap between inner tube 1 and mechanical protection layer 2. Air has a tendency to ionise in the presence of a high electric field and break down, causing damage to the surface of the hose containing the charged material. The total material thickness of the first flexible inner tube 1 provides most of the total insulation strength value. The use of multiple layers in a flexible hose with a small gap layers between allows the hose to be flexible. In the simplest embodiment any air-excluding medium may be used to fill the gap. However the inventors have determined that air in the gap between the flexible inner tube 1 and the first flexible mechanical protection layer 2 should be excluded. This is because that under some conditions, the presence of air may cause insulation breakdown at the surface of the flexible inner tube 1, such as in the form of partial discharges.

Preferably the air-excluding medium also acts in part as a lubricant to reduce any friction when the flexible inner tube 1 is moved inside the first flexible mechanical protection layer 2, so an oil or grease such as vaseline is preferred. The oil or grease also has to be non-conducting to prevent voltage leakage from the inner tube 1 to the first flexible mechanical protection layer 2. The lubricating function plays a role in facilitating movement of the inner tube with respect to the outer mechanical protection layer during bending, both during axial bending and, importantly, during torsional rotation of the inner hose. As mentioned above, the air-excluding medium preferably has a viscosity or other material properties sufficient to maintain a film of medium between the flexible inner tube and the outer protection layer when the flexible hose is subject to bending or flexing. The flexible hose 5 is designed such that mechanical stress and friction between the flexible inner tube and an outer mechanical protection hose or layer is to be avoided or at least minimised. This reduces wear generally, of course, but it is important to maintain the surface integrity of the inner hose material. The outer surface of the flexible inner tube 1 is fully protected from mechanical wear or chafing by a suitable air excluding medium so as to make full use of the insulation strength of the inner hose material, and thus permit a relatively thin wall for the inner hose 1. The thin wall of inner hose 1 permits in turn improved flexibility of the hose 5 as a whole.

Figure 3:
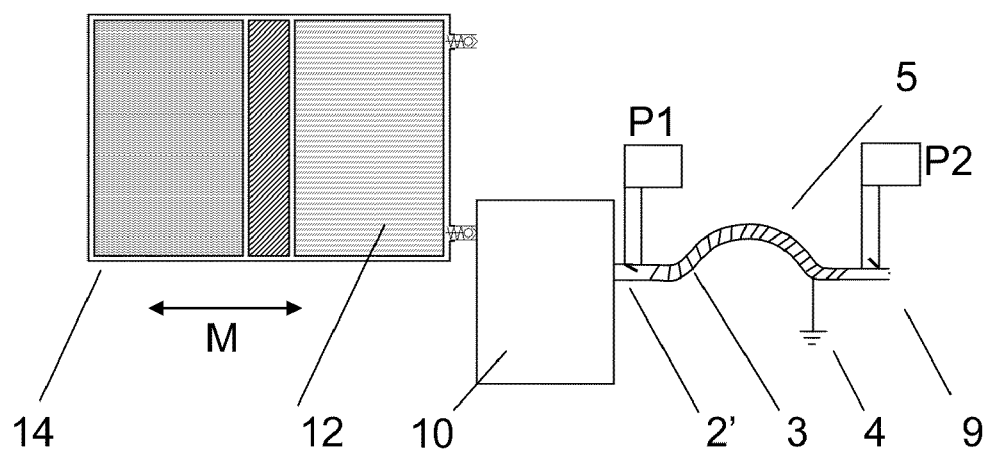
FIG. 3 shows a schematic arrangement for part of a painting apparatus or system comprising an improved flexible hose according to an embodiment of the invention.

FIG. 3 shows a schematic and simplified block diagram for a part of a paint application apparatus including a high voltage hose 5 according to an embodiment of the invention. The figure shows a dosing cylinder 14 containing conducting paint 6 or other fluid coating material. The dosing cylinder 14 is moveable as indicated by arrow M, and may be connected to a docking head 10. The docking head typically comprises a valve block or other valve means for routing paint and/or flushing solvent as desired to the spray head, or for changing paint colour, and/or may have valve means for flushing the docking head connection point and for conducting waste paint and flushing liquid away to a waste collection means.

The docking head is connected by flexible hose 5 to a spray gun or applicator 9. The outer surface of the hose 5 is covered in part by a conductive or non-insulating electrical protection layer 3 which is connected to a ground 4. The conductive or non-insulating electrical protection layer 3 may not extend for the whole length of the hose and may instead stop a predetermined distance away from one or both ends of the hose.

A pig may be introduced into the flexible hose to flush or clean the hose. As indicated, in FIG. 3 a pig insertion means P1 located at one point may be used to place a pig into the hose. The pig is then pushed through the flexible inner tube 1 of the improved hose 5 to clean out paint or cleaning residues. The pig thus used may then be extracted from another place in the line by eg a pig removal means P2.

During a painting operation the exterior surface of the hose will over time tend to accumulate a static charge. This static charge is eliminated according to an embodiment of the invention by grounding part of the surface of the exterior hose. This is done by arranging the exterior hose with the electrical protection layer fitted with conductive wires, copper tape, or a flexible conductive electrical protection layer 3 which is connected to ground 4. The grounded electrical protection layer 3 may be limited to within a safe distance D' away from one or both end/connecting points of the fluid hose. The external conductive or at least non-insulating layer may comprise a metal tape, for example a copper tape. The tape may be arranged wound around the outermost layer in different patterns, with gaps between adjacent turns or without. The gaps between adjacent turns may be specified to a predetermined amount. Other non-insulating materials such as conductive or semi-conducting metals plastics or composites may be substituted for the copper tape. The conductive or non-insulating layer for grounding the external surface of the first mechanical protection layer may alternatively be provided with a layer by other covering means, and may comprise a continuous layer, filaments other structure. The conductive, semi-conductive or non-insulating layer may be a layer 16 of the electrical protection layer 3, for example a region of a PTFE based plastic tube or layer to which conductive particles, for example of carbon or a metal have been added to achieve a conductive or semi-conductive layer at the outer surface of the outer electrical protection layer 3.

A paint application apparatus maintained in part at a high voltage comprising an insulated and flexible hose according to an embodiment of the invention is able to insulate the paint or fluid from the grounded surroundings without the hose being charged on the surface, and at the same time be flexible, so that the hose can be routed over a moving joint such as that between an robot arm and a spray gun or applicator. Such a paint application apparatus may be arranged connected to a robot equipped with one or more applicators. One or more such paint application apparatus may be arranged mounted on one or more robots of the multi axis type. Such a flexible hose as described may also be used to supply paint to applicators or spray heads arranged fitted on simpler machines than multi-axis robots, machines such as Cartesian robots, or reciprocating painting machines, side or top machines, or other machines that operate using only one or two degrees of freedom.

Figure 4:
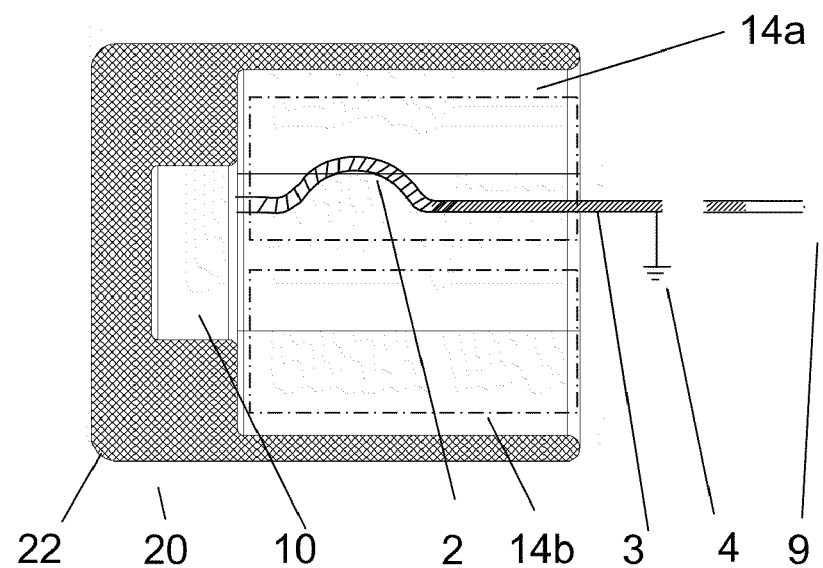
FIG. 4 shows a schematic arrangement for part of a painting apparatus comprising an improved flexible hose according to another embodiment of the invention.

FIG. 4 shows a part of a paint application apparatus comprising the flexible HV hose according to another embodiment of the invention. The figure shows an insulation cover 20 arranged to partly cover a docking head 10 and two dosing cylinders 14a, 14b shown with dotted lines as they are inside the cover. The figure shows a flexible hose connected to the docking head 10 at one end and leading out under the insulation cover for connection to an applicator head 9 at the other end. The flexible hose conducts dosed paint from the docking head 10 to the applicator or spray gun 9 at high voltage. It is covered with a non-insulating electrical protection layer 3 which is grounded, except for part of the hose (D') in close proximity to the connection points at the docking head and again close to the applicator.

Figure 5:
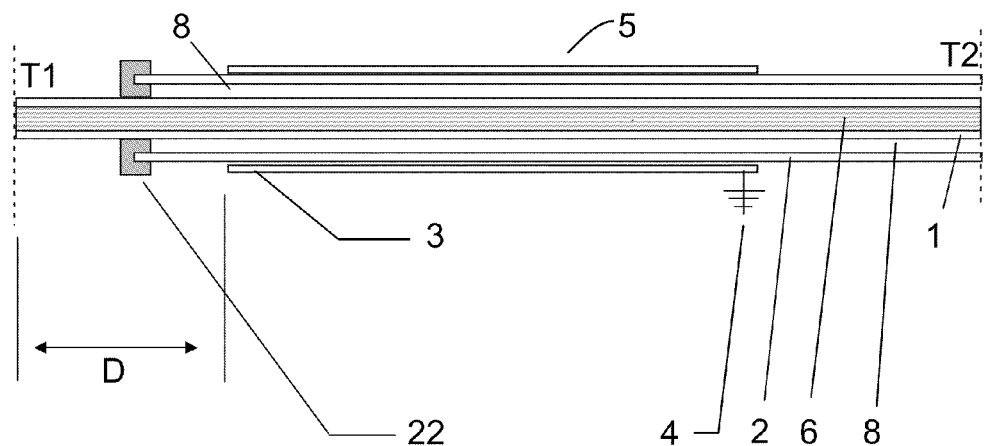
FIG. 5 shows a cross-section view of an improved flexible hose for a paint application apparatus, maintained in part at a high voltage, with end cap means closing off a space between a flexible inner tube and an outer mechanical protection layer according to another embodiment of the invention.

In another, preferred embodiment, shown schematically in FIG. 5, the flexible hose has a closure means 22 in the form of an end cap arranged to seal off the space between the first flexible mechanical protection layer 2 which surrounds the air excluding medium 8 and the inner tube 1 containing the paint fluid 6. For example when attaching the improved hose 5 to a paint valve or other part of the paint apparatus at e.g. terminal T1, the outer electrical protection layer 3 and other outer layers such as the first flexible mechanical protection layer 2 may be removed for a distance D just before the terminal T1. This is because the outermost mechanical protection layer is grounded and an attachment point such as T1 or T2 will be at high voltage if it is connected to the applicator. Electrical build-up leading to electrical discharge or sparking between the hose 5 and any part at high voltage e.g. T1 or T2 has to be prevented from occurring. In operation this is prevented by grounding the outer electrical protection layer 3, except for the short distance D, where the outer electrical protection layer 3 is removed before termination or joining. The first flexible mechanical protection layer 2 may end D' at the same distance from a termination or connection point T, or at a different distance, D≠D'.

Figure 6:
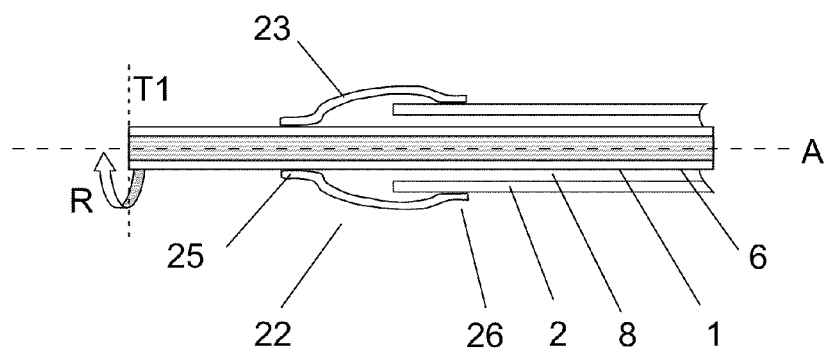
FIG. 6 shows a cross-section view of an improved flexible hose for a paint application apparatus, with end cap sealing means of a shrink-fit type, for sealing off a space between a flexible inner tube and an outer mechanical protection layer, according to another embodiment of the invention.

The sealing means 22 such as an end cap seals off the air-excluding medium in the space between the inner tube 1 and outer first flexible mechanical protection layer 2 so that no air-excluding medium may leak out and no air may leak in to that gap between inner tube 1 and first flexible mechanical protection tube or layer 2. In some embodiments the end cap may be in the form of a plug, such as a plug with a passage or hole in it to accommodate the flexible inner tube, or a sealing ring. However, to accommodate the torsional bending or rotation of the robot wrist or paint applicator 9, the end cap sealing together outer first flexible mechanical protection layer 2 and flexible inner tube 1 and is best designed to permit some rotation of the inner tube. FIG. 6 shows an end cap according to a preferred embodiment in which the end cap 22 is in the form of a shrink-fit closure 23. This is conveniently applied as a heat-shrinkable tube made from a flexible or even elastic material placed around the outer protection layer, and the tube is then heat shrunk at 26 onto the outer protection layer. The other end of the shrink fit end cap 23 is placed around the inner hose 1 and then shrunk into place at 25, fitting tightly around that inner hose. The shrink fit end cap seals the air excluding medium, prevents the ingress of air, but is also is flexible and permits some rotation of the inner hose by the applicator along the uncovered length D or D'. Inner hose 1 may thus be rotated R by movements of the applicator or robot wrist about a long axis A of the inner flexible hose without applying a significant torsional force to the remainder of the flexible hose 5.

In another embodiment a conductive or semiconductive electrical protection layer 3 that is connected to earth potential which covers the outer hose 2 may be mechanically protected by another heat-shrink sleeve or other covering forming an additional outer mechanical protection layer, a second outer mechanical protection layer.

Figure 7:
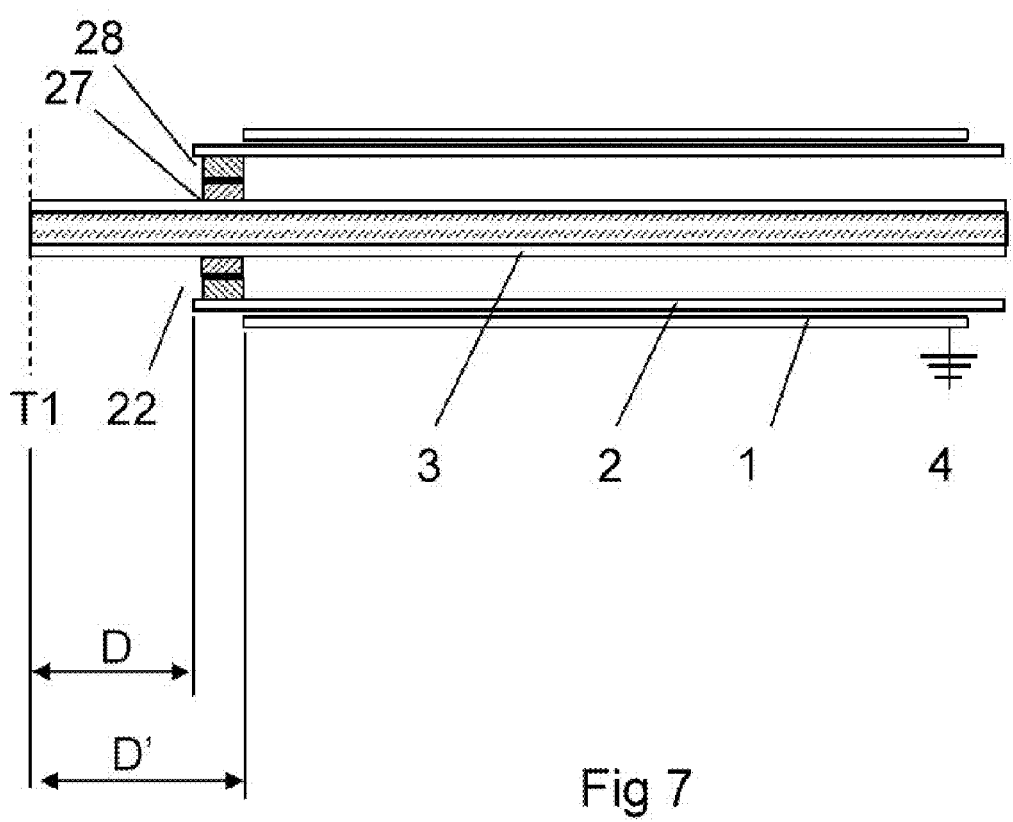
FIG. 7 shows a cross-section view of an improved flexible hose for a paint application apparatus, with a sealing means or end for sealing off a space between a flexible inner tube and an outer mechanical protection layer, arranged with a with mechanical means allowing relative rotation of the inner tube and an outer mechanical protection layer, according to another embodiment of the invention.

In another embodiment the end cap 22 that seals off the air excluding medium in the space between the inner hose 1 and outer protection layer 3 may be arranged with a moveable sealing part. FIG. 7 shows schematically a two-part end cap 22 with a first part 27 arranged abutting and fixed to the inner hose 1 and a separate and rotatable part 28 abutting and fixed to the outer layer 2. The two parts are rotatable with respect to each other, 27, 28 such that the space in between the flexible inner tube 1 and first flexible mechanical protection layer 2 is sealed off from the surrounding environment such that flexible inner tube 1 may still be rotated at the end cap with respect to the outer mechanical protection layer 2.

It should be noted that while the above describes exemplifying embodiments of the invention, there are several variations and modifications which may be made to the disclosed solution without departing from the scope of the present invention as defined in the appended claims.

What is claimed is:

1. A flexible high voltage hose for a paint application apparatus maintained in part at a high voltage, wherein said hose comprises a flexible inner tube containing a coating fluid or paint at a high voltage arranged inside at least one first flexible mechanical protection layer where a space arranged between the flexible inner tube and the first flexible mechanical protection layer is filled with a fluid air-excluding medium, wherein at least one end of the flexible inner tube is sealed with a sealing means or end cap sealing the space between the first mechanical protection layer and the flexible inner tube and thus arranged for preventing leakage of the air excluding medium and/or entry of air.

2. The flexible hose according to claim 1, wherein the fluid air-excluding medium occupies the whole volume in between the flexible inner tube and the first flexible mechanical protection layer.

3. The flexible hose according to claim 1, wherein the first flexible mechanical protection layer of the hose is wholly or partly covered by a electrical protection layer which is conductive or non-insulating and which is connected to a ground or earth terminal.

4. The flexible hose according to claim 1, wherein the flexible hose may have more than one mechanical protection layer arranged surrounding the first flexible mechanical layer.

5. The flexible hose according to claim 1, wherein the fluid air-excluding medium is a fluid with material properties sufficient to maintain a film between the outside surface of the flexible inner tube and the inside surface of the outer mechanical protection layer.

6. The flexible hose according to claim 1, wherein the fluid air-excluding medium has lubrication properties to provide lubrication between the inner surface of the first flexible mechanical protection layer and the outer surface of the flexible inner tube.

7. The flexible hose according to claim 1, wherein the fluid air-excluding medium is a non-polar fluid.

8. The flexible hose according to claim 1, wherein the fluid air-excluding medium is an oil or a grease with non-conductive characteristics.

9. The flexible hose according to claim 1, wherein the fluid air-excluding medium comprises vaseline.

10. The flexible hose according to claim 1, wherein at least one end of the first mechanical protection layer is sealed with a sealing means or end cap joining it to the flexible inner tube and thus arranged for preventing leakage of the air excluding medium and/or entry of air.

11. The flexible hose according to claim 1, wherein sealing means or end cap joining the first mechanical protection layer to the flexible inner tube is flexible and accommodates a rotary movement of the inner hose about its long axis relative to the first mechanical protection layer.

12. The flexible hose according to claim 1, wherein the sealing means or end cap joining the first mechanical protection layer comprises two parts movable with respect to one another arranged sealing the air excluding medium between the flexible inner tube and the first mechanical protection layer and permitting rotary movement of the flexible inner tube about its long axis relative to the first mechanical protection layer.

13. The flexible hose according to claim 1, wherein the sealing means or end cap is arranged as a shrink-fit form suitable for application to the inner tube and making a seal with the flexible inner tube by shrinking.

14. The flexible hose according to claim 1, wherein the first flexible mechanical protection layer is arranged adjacent to and in contact with at least one further mechanical protection layer.

15. The flexible hose according to claim 1, wherein a second flexible mechanical protection layer of the hose is wholly or partly covered by an electrical protection layer which is conductive or non-insulating and comprises a metal tape, wire or filament which is connected to a ground or earth terminal.

16. The flexible hose according to claim 4, wherein the at least one electrical protection layer comprises a semiconducting material which is connected to a ground or earth terminal.

17. The flexible hose according to claim 1, wherein the first flexible mechanical protection layer around the flexible inner tube extends to less than the full length of the flexible inner tube and is limited to within a predetermined distance from at least one connection point of the hose.

18. The flexible hose according to claim 16, wherein the conductive or non-insulating electrical protection layer around the hose and connected to ground or earth potential does not extend the full length of the hose and is limited to within a predetermined distance from at least one connection point of the hose.

19. The flexible hose according to claim 1, wherein said hose is a flexible hose and comprises a flexible inner tube containing a paint and the inner hose is constructed in a material with properties suitable for pigging.

20. The flexible hose according to claim 1, wherein said hose is a flexible hose and comprises an inner hose containing a paint and the inner hose is arranged with means for insertion and removal of a pig.

21. A flexible high voltage hose for a paint application apparatus maintained in part at a high voltage, wherein said hose comprises a flexible inner tube containing a coating fluid or paint at a high voltage arranged inside at least one first flexible mechanical protection layer where a space arranged between the flexible inner tube and the first flexible mechanical protection layer is filled with a fluid air-excluding medium;
wherein the outer surface of a flexible mechanical protection layer the hose is partly covered by a tape comprising metallic copper.

22. The flexible hose according to claim 21, wherein the fluid air-excluding medium occupies the whole volume in between the flexible inner tube and the first flexible mechanical protection layer.

23. The flexible hose according to claim 21, wherein the first flexible mechanical protection layer of the hose is wholly or partly covered by a electrical protection layer which is conductive or non-insulating and which is connected to a ground or earth terminal.

24. The flexible hose according to claim 21, wherein the flexible hose may have more than one mechanical protection layer arranged surrounding the first flexible mechanical layer.

25. The flexible hose according to claim 21, wherein the fluid air-excluding medium is a fluid with material properties sufficient to maintain a film between the outside surface of the flexible inner tube and the inside surface of the outer mechanical protection layer.

26. The flexible hose according to claim 21, wherein the fluid air-excluding medium has lubrication properties to provide lubrication between the inner surface of the first flexible mechanical protection layer and the outer surface of the flexible inner tube.

27. The flexible hose according to claim 21, wherein the fluid air-excluding medium is a non-polar fluid.

28. The flexible hose according to claim 21, wherein the fluid air-excluding medium is an oil or a grease with non-conductive characteristics.

29. The flexible hose according to claim 21, wherein the fluid air-excluding medium comprises vaseline.

30. The flexible hose according to claim 21, wherein at least one end of the first mechanical protection layer is sealed with a sealing means or end cap joining it to the flexible inner tube and thus arranged for preventing leakage of the air excluding medium and/or entry of air.

31. The flexible hose according to claim 21, wherein the sealing means or end cap is arranged as a shrink-fit form suitable for application to the inner tube and making a seal with the flexible inner tube by shrinking.

32. The flexible hose according to claim 21, wherein the first flexible mechanical protection layer is arranged adjacent to and in contact with at least one further mechanical protection layer.

33. The flexible hose according to claim 21, wherein a second flexible mechanical protection layer of the hose is wholly or partly covered by an electrical protection layer which is conductive or non-insulating and comprises a metal tape, wire or filament which is connected to a ground or earth terminal.

34. The flexible hose according to claim 24, wherein the at least one electrical protection layer comprises a semiconducting material which is connected to a ground or earth terminal.

35. The flexible hose according to claim 21, wherein the first flexible mechanical protection layer around the flexible inner tube extends to less than the full length of the flexible inner tube and is limited to within a predetermined distance from at least one connection point of the hose.

36. The flexible hose according to claim 34, wherein the conductive or non-insulating electrical protection layer around the hose and connected to ground or earth potential does not extend the full length of the hose and is limited to within a predetermined distance from at least one connection point of the hose.

37. The flexible hose according to claim 21, wherein said hose is a flexible hose and comprises a flexible inner tube containing a paint and the inner hose is constructed in a material with properties suitable for pigging.

38. The flexible hose according to claim 21, wherein said hose is a flexible hose and comprises an inner hose containing a paint and the inner hose is arranged with means for insertion and removal of a pig.

* * * * *